United States Patent
Kassan et al.

(10) Patent No.: US 7,194,439 B2
(45) Date of Patent: Mar. 20, 2007

(54) METHOD AND SYSTEM FOR CORRELATING JOB ACCOUNTING INFORMATION WITH SOFTWARE LICENSE INFORMATION

(75) Inventors: Peter Kassan, New York, NY (US); Steven Youchnow, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 948 days.

(21) Appl. No.: 09/845,611

(22) Filed: Apr. 30, 2001

(65) Prior Publication Data

US 2002/0161717 A1 Oct. 31, 2002

(51) Int. Cl.
*G06Q 99/00* (2006.01)
(52) U.S. Cl. ............... 705/51; 705/50; 705/43; 705/59; 709/222
(58) Field of Classification Search ............... 705/50; 719/222
See application file for complete search history.

(56) References Cited

U.S. PATENT DOCUMENTS

| 5,047,928 | A  | * | 9/1991  | Wiedemer ............ 705/52   |
| 6,049,789 | A  | * | 4/2000  | Frison et al. ......... 705/59 |
| 6,658,415 | B1 | * | 12/2003 | Brown et al. ......... 707/10  |
| 6,854,009 | B1 | * | 2/2005  | Hughes ............... 709/220 |
| 2001/0025269 | A1 | * | 9/2001  | Otsuka ............. 705/52    |
| 2001/0049707 | A1 | * | 12/2001 | Tran ............... 707/530   |
| 2002/0166117 | A1 | * | 11/2002 | Abrams et al. ...... 717/177   |
| 2003/0126084 | A1 | * | 7/2003  | Drummond et al. .... 705/43    |
| 2004/0107125 | A1 | * | 6/2004  | Guheen et al. ....... 705/7    |
| 2005/0198239 | A1 | * | 9/2005  | Hughes ............. 709/222   |

* cited by examiner

*Primary Examiner*—Firmin Backer
(74) *Attorney, Agent, or Firm*—Ostrolenk, Faber, Gerb & Soffen, LLP (57) ABSTRACT

A job accounting and chargeback system for software products is comprised of a software license manager in the form of a software product use monitoring subsystem that handles requests for and grants rights to use software products, in such a manner that chargeback data is developed, which is then referenced to entities that are charged for the use of the software products. To better correlate the chargeback data with the use of software products, the chargeback data is referenced to the actual amount and type of use of software products being used, rather than on the use of computer facilities.

21 Claims, 3 Drawing Sheets

Process Detail Record

| Process ID | Detail Link |
|---|---|
| | |
| 4123 | 65032 |
| 4123 | 65045 |
| 4123 | 65046 |
| | |
| 5551 | 75221 |
| 5551 | 75222 |

| Process ID | Detail Link |
|---|---|
| | |
| | |
| | |
| | |
| 31676 | 98744 |
| 31676 | 99338 |
| 31676 | 99912 |
| | |

SMF Data File 65032
65045
65046

METHOD AND SYSTEM FOR CORRELATING JOB ACCOUNTING INFORMATION WITH SOFTWARE LICENSE INFORMATION

BACKGROUND OF THE INVENTION

The present invention relates to computers and, more particularly, to a method and system that improves computer software job accounting and software chargeback functions at computer data centers.

A typical information technology (IT) job accounting and chargeback system (JACS) such as CA-JARS MVS and CA-PMA/Chargeback from Computer Associates, CIMS from CIMS Labs, Inc., COSchargeback from OSM, M-PWR Chargeback from Nicus Software, and ChargeBack from Tidal Software; collects and maintains cost and usage data about a variety of system resources—jobs, interactive sessions, CPU time, system connect time, system memory, processors, disk usage, print output, usage of particular hardware devices, transactions, etc.

As such, a JACS provides IT managers the ability to
Inform users about their actual usage of system resources
Charge users (or departmental budgets) according to their usage
Improve system utilization and efficiency
Help reduce costs On most computer systems, a variety of information about the resources used by particular program-processes that execute on each Operating System (OS) is captured and recorded or logged, either by facilities within the OS itself or by other software facilities operating on the system such as job accounting or program monitoring software. On some computers, such as the S/390 mainframe, multiple logical partitions (LPAR) can be established in which separate operating systems may operate concurrently. Each operating system instance, referred to as a Logical Operating System or LOS, whether controlling an entire computer, a partition of a computer, a complex of computers, or network of computers, generates its own resource usage information that can be used by job accounting or program monitoring software. For example, process-related information on OS/390 mainframes may include data such as:

job-name;
job-id;
LOS-id;
"accounting" information applicable to the job such as a user ID, as well as a variety of platform-specific and installation-specific accounting information such as department code, customer code, outsource client code, etc.;
job-step-id;
executing module or program name;
a date and timestamp of the program start and stop times;
amount of CPU-time consumed by the process;
libraries, files or databases used by the process;
number of input or output operations performed;
print output such as the device, device type, number of pages, etc.;
etc.

In the OS/390 mainframe environment, much of this process-related event information is gathered by the LOS or by its components and recorded in the System Management Facility (SMF) data file.

As an example of process-related information gathered by other software facilities SoftAudit, a product of Isogon Corporation, captures information about each module used by a job or job-step and records this and additional information in its own log-file. Similarly, optimization and tuning products, such as InTune from BMC or Strobe from Compuware, capture information related to the efficiency of the process and record this information in their own files. But, as an alternative, some products of this sort record their information in the OS/390 SMF data-file, using system facilities that permit data to be written to this data file as special records. This is done as a convenience, so that the end-user need not deal with a multitude of data files containing diverse data.

Combining this data with user-specified accounting information, the typical JACS translates this into actual charge and accounting information that is output as printed or online reports or provided as input for other software products such as an accounting system.

The typical JACS also permits the user to establish a scale of rates for each resource—for any number of time ranges throughout the day, for different days of the week, for the priority requested, for the turn-around time requested, etc. Such rate scales can be contained within a hierarchy of accounts, price schedules and a multi-level cost center structure. Further, the typical JACS also maintains all the relevant information in a relational database, and enables the user to perform ad hoc queries, custom reporting, forecasting, budget control, "what-if" analysis, etc. A full-featured JACS generally offers a great many other additional features, too numerous and extensive to detail here.

A software product is typically composed of numerous executable modules that are installed in one or more libraries, and, in some cases, certain modules may be shared among several products. When, for example, on OS/390 a particular job or job-step is run, it might utilize a single software product or multiple software products. However, the SMF event data only identifies the modules specified in the Job Control Language statements. Any other software modules that may have been invoked in the job and the software products which they comprise are not identified.

The typical JACS does not have usage data organized according to a software product, hence it is unable to correlate resource usage data with the identity of the software product or products used by the job or job step. Accordingly, the IT manager is unable to use a JACS to accurately calculate and chargeback the cost of using these products to the respective users.

Furthermore, the cost of licensing many software products is based upon a variety of criteria such as their functionality, number of users, power rating of the computer, etc. Some software might be free or have a nominal cost, whereas others are very expensive.

On the other hand, a technical license manager (TLM), such as an XSLM-compliant license manager (XSLM), records software product licensing events. In particular, an XSLM records such events when a software product requests permission to execute on a particular computer or partition under a particular operating system, i.e., it begins a licensing session. The record kept by the XSLM generally includes such details as whether that request was granted or not, the date and time the request was made, the ID of the user requesting execution of the product, possibly the power rating (MIPS, MSUs, etc.) of the computer or partition, etc. Further, the XSLM requires that each vendor be identified by a unique vendor ID and that the vendor assign each product a unique vendor-specific product ID which can be used to derive the names of the vendor and product. This information is also recorded when a licensing session is begun.

Though the XSLM may potentially gather a great deal of data related to the use of licensed software, it is not concerned with determining the particular program-process that might be using the software in a particular instance, or other process-related information, since this information is generally not relevant to issues of enforcing the licensing and licensed rights of the licensor of the licensed software.

Thus, while the XSLM gathers information that can be of value to a JACS, it does not record any information about the particular job, job step, or process associated with that license request. Hence, the JACS has available a source of software product usage data, but without an effective means of correlating it with process related event information.

Whereas in the past, it was "easy" to reflect the actual cost of usage by measuring hardware resource usage, this is no longer true. The general trend of declining hardware prices and rising software prices is expected to continue. Hence, the IT manager would reap greater benefit by being able to treat software products as a "resource"—directly measuring and charging back the cost of their usage.

SUMMARY OF THE INVENTION

It is the object of the present invention to provide a method and system in which a JACS correlates software product usage information with process related event information.

It is another object of the present invention to provide a method and system in which a JACS determines how to charge back the cost of software products to the users commensurate with their usage.

It is a further object of the present invention to provide a method and system in which the JACS stores software product resource usage and chargeback information in a log such that it is automatically correlated with software product licensing information.

The foregoing and other objects of the invention are realized by a method and system which combines the functionality of a JACS with a license manager, e.g., an XSLM. Preferably, the functionality of the JACS is combined both with the license manager and with a software product usage monitor capable of resolving software usage to product names and vendors. In similar fashion, the JACS can be combined with a software usage monitoring program, such as the present assignee's SoftAudit software product, for the purpose of enabling chargebacks for the use of software products which are resolved to the departments, divisions, individuals, organizations, or any other type of entity, based on the use of software resources, as opposed to computer hardware and the like.

The invention can be implemented by interfacing various components, such as the JACS, XSLM or the software usage monitor to one another. Alternatively, existing components, such as the XSLM license manager, can have portions thereof configured to include the functionality provided by a JACS. Information and/or reports that are provided by the system of the invention can correlate chargebacks based on the use of software product, providing such particulars as license certificate information, or license agreement information, as well as relevant process-related data such as user-id, LOS, job-name, job-id, job-step-id, etc.

Other features and advantages of the present invention will become apparent from the following description of the invention which refers to the accompanying drawings.

DETAILED DESCRIPTION OF EMBODIMENTS OF THE INVENTION (a) Introduction:

The term "intercept" means the ability to alter the flow of control of an existing program or operating system in a transparent manner in order to perform a prescribed operation and then return control back to the intercept point and continue processing as though nothing has happened as far as the existing program or operating system is concerned. Typically, techniques for introducing, or "hooking", an additional set of instructions into an existing program or operating system are familiar to those skilled in the art. These may include techniques such as renaming an existing module and substituting a module with the original name or dynamically changing an address vector to point to the new program, retaining the address of the original program so it can be invoked after the new program competes its operations.

The term "exit" represents a point in a software product at which a user exit routine may be given control to change or extend the functions of the software product at user-specified events. While hooking is provided unbeknownst to the hooked application, user exit routines are expected to be used and their interactions with the application are expected to follow certain rules defined by the application.

As used herein, exit routine represents program code that may be given control through the use of an "intercept," through an exit, or as program code specifically included in the implementation of the License Manager that gains control during normal license processing.

Software products, operating on a LOS, as part of the current job-step or process, are considered the clients, while the XSLM, which may be operating on the same or a different LOS, is considered the server. Depending upon the architecture of the particular computer system and operating system, a LOS may have multiple jobs or processes executing concurrently, each within a separate address space (or partition, or region, etc.). Software products invoke the XSLM by issuing one of the defined function calls, which is initially processed by an XSLM agent operating in conjunction with the client. The agent can perform its processing from within the client address space, or the agent can reside in its own address space. The agent passes the request to the XSLM server and returns the results to the client.

In a co-pending application of the assignee of the present invention, entitled METHOD FOR CORRELATING JOB-STEP OR EXECUTION-PROCESS INFORMATION WITH CORRESPONDING SOFTWARE LICENSING INFORMATION, Ser. No. 09/845,235, filed on the same date as the present application (and the contents of which are incorporated by reference herein), several means are described for associating a number identifying an executing process (e.g., a process id) with its corresponding software product licensing information, as managed by an XSLM-compliant license manager. In a preferred embodiment, server and client exit routines (SER and CER routines, respectively) are incorporated into the XSLM server and its client/agents to associate a unique token with a process-id when a licensing session is begun. Subsequently, a Correlator process uses each of the tokens to correlate the appropriate process-id data to the licensing session data that has been gathered and, acting upon user-specified criteria, provide such data as an input to another program, a printed report, log file, data base, spreadsheet, etc.

For example, in the OS/390 mainframe environment, this may take the form of correlating licensing sessions with job-numbers. Once this correlation is obtained, the license session data can then be further correlated with any other data that is keyed by, or tagged with, the job-number. Further, the license session data provides the identity of the software products used by the respective job-numbers and other useful information such as the duration of time the license was held with the process ID.

(b) JACS Embodiments:

In one embodiment, the JACS augments its resource usage data by using the Correlator to retrieve process data and corresponding product information. The sequence of operations is as follows:

1. Determine the criteria for JACS processing including the set (one or more) of known LOSs to consider. This may be user-specified, a predetermined set, or simply all LOSs found.
2. Execute (or signal) the Correlator process to act upon the specified criteria. Alternatively, the JACS can extract this data from the database, data file or output file that is produced by the Correlator according to the specified criteria.
3. Retrieve and process the Correlator output, saving it in an appropriate product-process detail record format.
4. Retrieve the appropriate process data from SMF data files, etc. and save it in an appropriate detail record format.
5. Process the resultant detail records according to the specified criteria.

Accordingly, thus enabled, a JACS is capable of correlating job and process accounting information with software product information in several ways such as:

- JACS process resource information correlated and presented with software product information
- Organize JACS results according to other perspectives such as by software vendor or product.
- Job accounting and chargeback based on software products as chargeable resources A typical JACS makes use of detail records, sometimes the event log records themselves or records derived from the event log records by the JACS itself or by another, independent software product. These records are hereinafter referred to as "process detail records".

Figure 1:
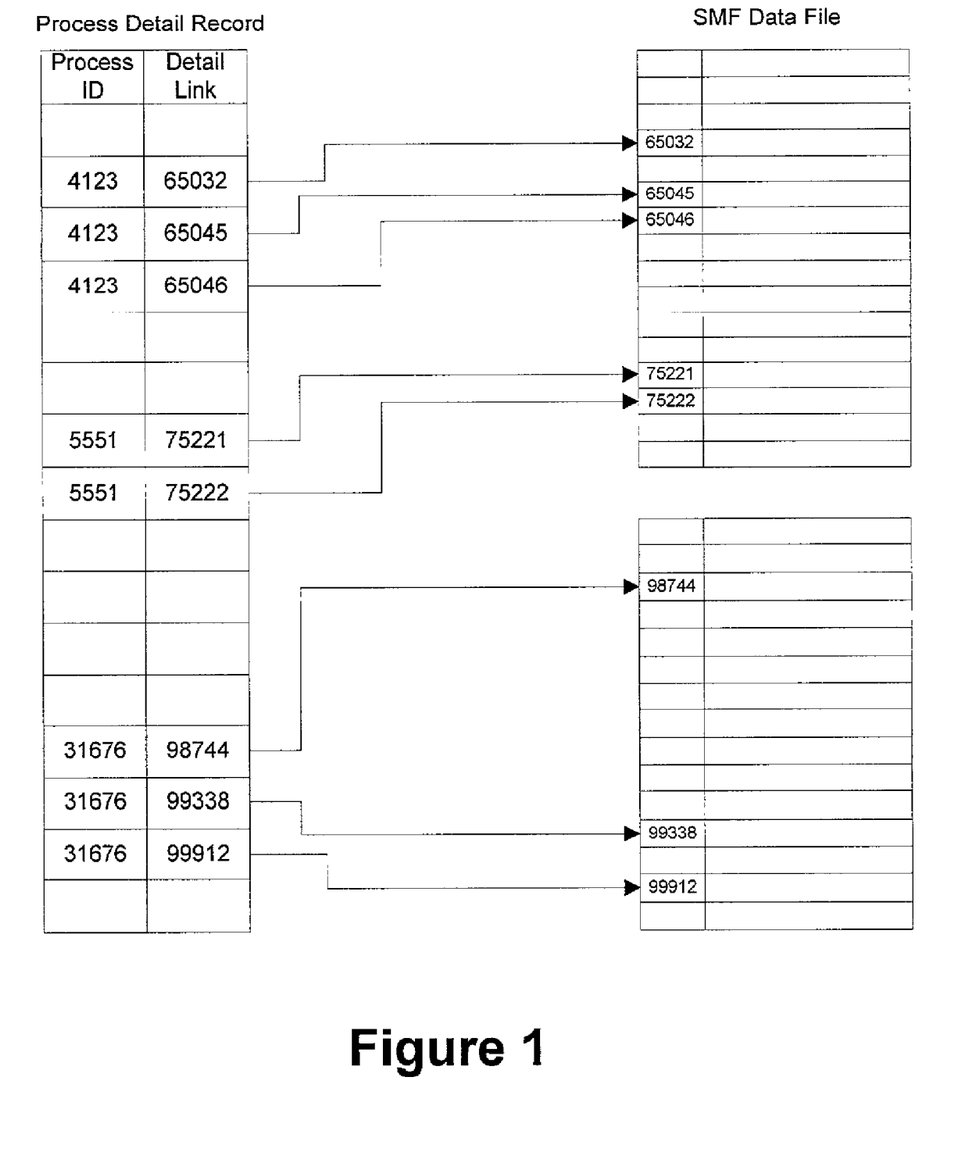
FIG. 1 is a sample representation of process ID linked to SMF detail records.

In its simplest form, a process detail record contains the process ID and all of the detail that pertains to resources used by that process ID. More typically, a process detail record contains the process ID and references (links) to all event log records associated with that process ID. In some cases, several process detail records are created for each process ID, each detailing the use of a particular system resource. The JACS may store these records in a database, table or file. (FIG. 1 is a sample representation of process ID linked to SMF detail records.)

Note that the term key or link is meant to describe a reference mechanism that can be used to determine the correct location of a data record in a database, file or table. The data comprising the key can be the record key of a database record, an index into a table or file, a pointer to an in-memory table, data that can be used to produce a reference value such as a hash index, etc.

In a preferred embodiment, the present invention accepts and processes Correlator output data to create new process detail records that link the software product used to the corresponding process ID. This "process-product-link" record type consists of at least two fields, one consisting of the key (or reference) pointing to the process detail record (or the process ID) and a product key, possibly consisting of a vendor ID and a product ID. Optionally, a third field, a link to the particular licensing session such as the XSLM license handle, is retained in the detail record thus enabling the JACS to retrieve event data related to the licensing session. (FIG. 2 is a representation of this type of record).

The JACS stores these records in its own database or a separate database, table or file. The resulting records provide the mapping necessary to properly detail the use by the process of one or more software products. The JACS is thus enabled to access this table whenever it is desired to associate process detail information with vendor and product information, allowing the user to sort, filter, search, display, report, query, aggregate, etc., by product and vendor.

Figure 2:
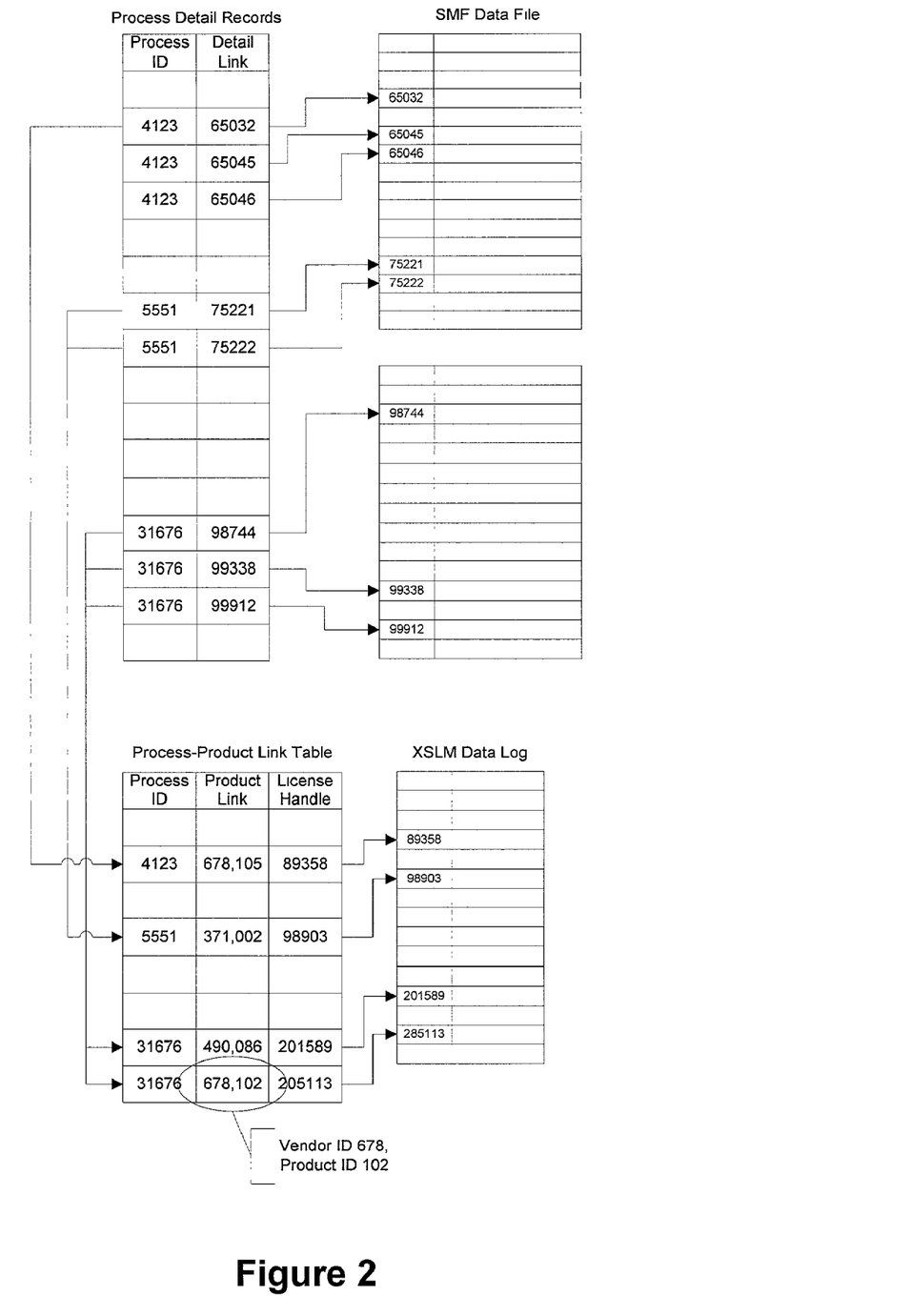
FIG. 2 is a representation of a type of linking record that is part of the invention.

For example, referring to FIG. 2, as the JACS processes the process detail records, it uses the process ID to lookup the vendor and/or product IDs in the process-product-link table. Upon locating the records from the process-product-link table, the JACS determines the vendor and/or product names, as derived from the XSLM, to include in the JACS output. Additionally, the JACS uses the license handle to lookup and process the appropriate XSLM Data Log records pertaining to the software product's execution in order to include other product resource information.

An alternative embodiment of the present invention changes the structure of the process detail record to include fields for vendor ID and/or product ID; the values of which are obtained from the Correlator output. Yet another embodiment creates a separate table or file, each record of which consists of the process detail record key and the vendor name and/or product name.

This has immediate benefit, since product information is much more meaningful than often cryptic and arbitrary job identification. Such an enhanced JACS provides product information along with information previously provided, wherever it is appropriate to do so. For example, an invoice or chargeback memo sent to a user or department may list the products used during the period of time encompassed by the invoice, and may key each line item charge to the product or products used. Such an enhanced system may also be used to answer such questions as:

- For a particular charge or set of charges, what product or products were used?
- For a particular user, department, business application, etc., over a particular time period, what product or products were used?
- What product or products were used by users, departments, business applications, etc., that were over budget? What were the charges associated with each product in this category?
- What product or products are involved in the fastest-growing expense categories (users, departments, business applications, etc.)?
- What product or products were used in the processes accounting for the greatest expense (or the most revenue) to the IT organization? Which product or products were used in the processing accounting for the least revenue?

The JACS also provides views, displays, queries, reports, etc., from a point of view previously unavailable: the vendor or product. Referring again to FIG. 2, when it is desired to produce a report sorted by software product, the JACS sorts the process-product-link table according to the product column and then uses this list as an index to lookup the process ID detail information for each software product.

By enabling the user to sort, filter, search, display, report, query, aggregate, etc., by product and vendor the JACS can answer such questions as:

For a particular product or set of products, what charges were incurred (during a particular time period, by a particular user or department, on a particular processor, etc.)?

For a particular product or set of products, what user or department incurred the most charges? What user or department incurred the least charges?

For each product, what are the total charges? What product accounts for the highest charges? What product accounts for the lowest charges?

For a particular product or set of products, what is the forecast of future charges?

An additional major function enabled by the correlation of the process usage data with the product licensing data is the ability to accurately charge back the costs for a product to the users based on various usage metrics.

For example, suppose that a particular product at a computer installation is licensed for a fee of $10,000 per month and, further that this installation decides that CPU or elapsed time of the job step using the product is a reasonable measure of usage for this particular product. On a monthly basis, the JACS is instructed to allocate the $10,000 among the users or departments that used the product in the past month proportionate to each user or department's CPU or elapsed time use of the product out of the total for that month.

In one embodiment, the JACS instructs the Correlator to return the process ID and the amount of time a license was held by the software product (which indicates the duration of use of that product). This measure is used by the JACS to allocate the cost of a software product. Optionally, the process-product-link record type is enhanced to include fields in which details pertaining to the use of the product are recorded, including information such as the time the license was held by that process.

Such a product-based method of chargeback can be based on a variety of other usage metrics such as a combination of CPU time and elapsed time. Or, as might be applicable to a sort product, the metric might be a count of records read or written. For a database product, a chargeback could be based on the number of queries processed or number of records returned. A department could be charged based on the number of unique users using the product, the maximum number of concurrent users using the product, etc.

In yet another embodiment, the present invention provides a method and system whereby the JACS stores software product resource usage and chargeback information in a log such that it is automatically correlated with software product licensing information.

Figure 3:
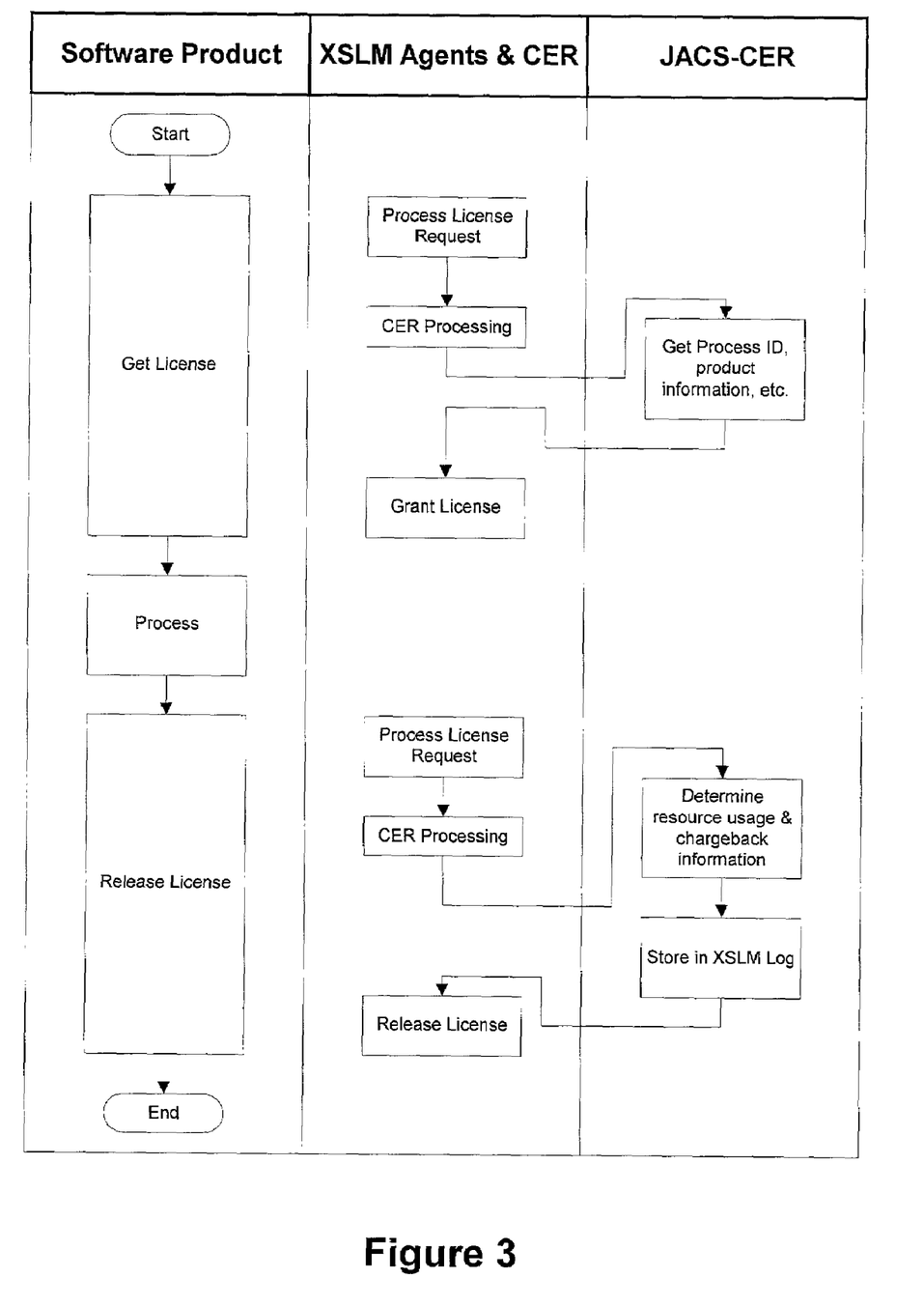
FIG. 3 is a top level flow chart showing interactions between XSLM agents, JACS and executable software products.

In an extension of the method described in the aforementioned co-pending patent application (partially described in section (c) below), processing elements of the JACS are incorporated into the CER routines of the XSLM agents (hereinafter, JACS-CER). Referring to FIG. 3, when a software product (i.e., an XSLM client program) begins a licensing session it makes a Get-License function call to the XSLM agent [i.e., either the xslm_basic_request_license( ) or xslm_adv_request_license( ) API calls], at which point, the CER is invoked and then proceeds in its normal manner to gather various process-related information that identifies the job, job-step, or process that made the call, namely, the client. For example, in the OS/390 mainframe system, the identifying information can be the job-number (a system-wide number uniquely assigned by the operating system to each job that processes in the system), and optionally can include: 1) the job-step number (the first step of a job is number 1, the third step is number 3, etc.); and 2) the current date.

The CER performs its normal processing and passes control to the JACS-CER, which then acts to collect and/or create resource usage and chargeback information. Among the actions that the JACS-CER takes are:

Recording the current date and time (a timestamp)

Recording the process ID of the executing software product

Retrieving relevant license certificate information (e.g., maximum number of concurrent users, names of authorized users, etc.)

Recording the name of the current user.

The CER once again receives control when the license session ends, i.e., when the product issues the Release-License function call [using API calls such as xslm_basic_release_license( ) or xslm_adv_release_license( )]. Either before or after performing its normal processing, the CER passes control to the JACS-CER which then completes the task of creating resource usage and chargeback information in any of the following ways:

Use the timestamp to calculate the elapsed time used by the process

Use the process ID, immediately retrieve system resource usage data (e.g., SMF data, etc.)

Calculate chargeback information based upon resource usage by the software product Calculate chargeback information based upon the cost of the software product Calculate chargeback information based upon the details of the software product's license certificate (e.g., surcharges for use when out of compliance such as exceeding the number of allowed users)

Write any of this information to a log file such as the SMF data file, a separate log file, or the XSLM log (using the Log-Data function call xslm_adv_record( ) or xslm_adv_log ( )).

Subsequently, reporting elements of the JACS retrieve the JACS data from the XSLM log wherein each record contains usage and chargeback information that is automatically organized according to the software product for which that data was obtained.

It should be noted that the present invention permits a great deal of flexibility in calculating chargeback information that is not possible using a conventional JACS. For example, Chargebacks can be made fairly according to the cost of a software product. The chargeback rates for a software product costing $10,000 per month would be proportionally higher than one costing only $2,000 per month.

Chargebacks can be automatically allocated according to the fluctuation in total usage. In order to recover the entire monthly expense of a software product, the usage fee fluctuates in proportion to the total usage per month where during periods of higher usage the fees (such as cost per cpu-second) would be lower and vice versa. For example, for a software product costing $10,000 per month that is used a total of 10,000 cpu-seconds in a given month might be charged back to the users at a rate of $1 per cpu-second.

The costs of certain resources can be bundled into the chargebacks of selected software products. For example, if product "A" generally outputs to a flatbed plotter, the costs for the plotter may be bundled into the chargeback for product "A" whereas, the user is charged back plotter costs if it is used by other products.

In another embodiment, the JACS correlates independently obtained software product usage information with process related information. In the absence of an XSLM (or other TLM) or as an alternative to using a TLM, the JACS obtains the identity of the product and the vendor from equivalent data gathered and produced by software-identification-and-usage-monitoring tools such as SoftAudit from Isogon. SoftAudit is a patented product described in U.S. Pat. No. 5,590,056, the contents of which are incorporated by reference herein.

In this instance, the JACS makes use of the data produced by SoftAudit by extracting the software product usage information from the usage logs produced by the SoftAudit Exporter or Reporter processes. Such information contains much of the same data as can be obtained from the XSLM, but without license certificate information. For example, data produced by SoftAudit can be filtered to produce output according to job name, user ID, product name, etc.

Additionally, processing elements of the JACS are incorporated into monitoring programs such as the SoftAudit MONITOR to perform software product identification in real-time as the product is executing and write this information into the MONITOR detail records, the SMF log, or a separate log. The same sort of correlation are made between JACS data and SoftAudit data, and the same benefits obtained.

Since the JACS provides product identification, the invention makes it additionally possible to provide similar linkage capabilities to all the data-viewing and reporting facilities of a software identification and usage monitoring tool such as SoftAudit Spotlight from Isogon. Such a facility permits the user to view product installation and usage information in a variety of ways such as by product, vendor, computer, partition, user, etc. Thus, for example, a user of the JACS seeing a product whose total chargeback is over budget can quickly and easily determine where the product was installed, how much it was used, by whom, etc. and take actions accordingly.

In a system of computers using the XSLM license management system, each product may be associated with one or more license certificates on one or more XSLM license servers. A license certificate contains information such as the entity entitled to execute the product and certain license rights, such as the total capacity (such as MIPS) that the product can execute on, the number of users that can use it concurrently, etc. An XSLM further provides a means of finding the certificate(s) for a particular product and displaying the information in the certificate. Since the novel JACS of the invention has been enhanced to provide product identification, it further enables optionally displaying the license certificate or certificates pertaining to a product. Thus, for example, if one is using the JACS to examine the charges incurred by a user who is over budget, for each product that the user has used it is possible to display or report on the information in the certificate or certificates for that product.

The JACS that has been enhanced to provide product identification, also enables providing linkage to a contracts repository product such as Isogon's Vista. In the same way in which the certificate or certificates associated with a given product could be accessed, the information typically stored in a contracts repository (license terms and conditions, invoice history, contact information, etc.) can be accessed.

(c) Correlator Description:

Provided below is a portion of the description of the correlator and related functions/facilities described in the aforementioned pending patent application, which are relevant to the present invention.

Software products, operating on a LOS, as part of the current job-step or process, are considered the clients, while the XSLM, which may be operating on the same or a different LOS, is considered the server. Depending upon the architecture of the particular computer system and operating system, a LOS may have multiple jobs or processes executing concurrently, each within a separate address space (or partition, or region, etc.). Software products invoke the XSLM by issuing one of the defined function calls, which may be initially processed by an XSLM agent operating in conjunction with the client. The agent can perform its processing from within the client address space, or the agent can reside in its own address space. The agent passes the request to the XSLM server and returns the results to the client.

For each request made by a client, the XSLM server processes the request, records the relevant licensing data and returns appropriate information and/or return-codes to the client via the agent. For example, in the most simple case, a software product issues only two function-calls: the Get-License function-call (when the software product is about to begin processing and wants to verify that a valid license is in effect before doing so) and the Release-License function call (at the point that the software product is done with its processing). In this case, the licensing data that is recorded includes the identity of the software product, the identity of the LOS on which the product was executing, the time the license was requested, whether the license was granted or denied, and, if it was granted, when the license was relinquished.

In a number of the embodiments of the invention, certain data is recorded or logged from within the client processing environment. The data may be recorded in a variety of ways, including: to a database; to a file or log specific to this purpose; to a general-purpose system log such as the OS/390 SMF log; or to the XSLM log itself, by use of the Log-Data function call xslm_adv_log ( ), which permits arbitrary data to be written to the XSLM log and further, be associated with the current licensing dialog. The log may be intrinsically related to the current LOS, as is the case with SMF, or may contain information from a plurality of LOSs (as does the XSLM log), in which case each data-record logged is augmented with an identifier of the LOS it pertains to. Wherever the data is written, the logical collection of data produced within the client and logged using any of the preceding techniques will be referred to as the Client Logical Log (CLL).

In a preferred embodiment of the invention (A), the XSLM and its agents are augmented to associate client side process information with server side licensing information. The facilities for performing this are described below, beginning with embodiment (A):

1. A facility is provided for passing a token (i.e., unstructured data denoting job related information) between an agent and the XSLM server. In general, an agent creates a token and passes it along with other licensing information (data) to the server. The server token facility associates the data with the token in a manner such as by incorporating the token into the information record that is written to a log file, making the token an index into a database where a record of the data is recorded, etc. Similarly, when the data record is retrieved for an agent the token, if requested, is also returned.

Optionally, the XSLM and its agents are augmented to include the token facility as part of their normal license request processing.

2. Client Exit Routine (CER): XSLM agents are augmented by one or more exit-routines, which, if supplied, receive control during processing of XSLM Get-License function-calls issued by the client. The CER receives control in the client's address space (partition, or region), the agent's address space, or a different one.

When the client makes a Get-License function call, the CER is invoked and then proceeds to gather process-related information that identifies the job, job-step, or process that made the call. For example, in the OS/390 mainframe system, the identifying information can be the job-number (a system-wide number uniquely assigned by the operating system to each job that processes in the system), and optionally can include: 1) the job-step number (the first step of a job is number 1, the third step is number 3, etc.); and 2) the current date. As OS/390 "unique" job-numbers are assigned sequentially, the counter may be reset after some days, weeks, or months, therefore the date that the job was executed removes any potential ambiguity. Alternatively, as may be required on other systems, the process may be uniquely identified by the date combined with the time of day at which the process was initiated.

The CER then creates a unique token within the set of tokens generated by the CER on the current LOS. This can be done in a variety of ways, for example by maintaining a counter specific to the LOS, assigning its current value, perhaps combined with the date and time, to a new token, then incrementing the counter.

This token is then passed, along with other parameters and data connected with the Get-License function, to the XSLM server where it is further used in the processing of the request.

Either prior to or immediately after the Get-License function is processed by the server, the CER records the process-related information and the corresponding token (collectively known as the "CER-data") in the CLL, i.e., a private log, a system log such as SMF, or, to the XSLM log using the Log-Data function. The CER terminates, returning the value of the assigned token as an output-parameter to the agent.

Optionally, the CER retains the value of the token for use by other exit routines and XSLM function calls such as Release-License during the current licensing session.

While it is preferred that such exit routines are implemented in the XSLM agents, the same level functionality is achieved when they are placed in the individual clients.

3. Server Exit Routine (SER): The XSLM server is augmented by one or more exit-routines, which, if supplied, receive control during the processing of XSLM Get-License function-calls made by client programs.

Each time the SER is invoked, it receives as an input-parameter the same token that was created by the CER. The SER proceeds to record in the XSLM log, or elsewhere, the following information about the client:

the token;

a value intrinsic to the licensing dialog that uniquely identifies the current licensing session that the token applies to (a License Dialog Id, LDI), such as the license-handle; and the identity of the LOS that the licensing session applies to.

This information is collectively known as the "SER-data".

4. Correlator: The Correlator is a process that retrieves and correlates the CER-data from all CLLs and the SER-data that has been gathered. While the user may specify various criteria to be applied, the general operation of the Correlator is as follows:

Determine the set (one or more) of known LOSs to consider. This may be user-specified, a pre-determined set, or simply all LOSs found.

For each token entry in the CER-data, locate the corresponding entry in the SER-data. If the LOS for that token does not pertain to the set of LOSs, the data is ignored and processing continues by locating the next token in the CER-data.

For all matching records found, process the licensing session information as follows: Print report, write to a log file, pass to another process, etc.

Alternatively, the Correlator may create a database, spreadsheet or ordinary file containing all records found which can then be sorted according to the token and other factors as appropriate.

For example, in the OS/390 mainframe environment, this takes the form of correlating licensing dialogs with job-numbers. Once this correlation is obtained, the license session data can then be further correlated with any other data that is keyed by, or tagged with, the job-number. In an alternative embodiment (B), the SER is eliminated with the following changes:

1. The CER, using information returned by the server in response to the Get-License function call, creates its own LDI.

2. The CER gathers and records the process-related information together with the corresponding LDI in the CLL.

3. The CER assigns the LDI to be used as the token in future XSLM function calls for the remainder of the current license session.

4. The Correlator first reads the CLL to determine the LDI of the license session and subsequently uses it to retrieve the corresponding CER-data records with which it performs the matching and correlating process.

In yet another variant (C) of the preferred embodiment:

1. The CER creates a token, that in addition to being unique to the LOS, also contains a representation (optionally compressed or encoded) of the process-id, e.g., in the OS/390 mainframe environment, the job-number.

2. The step in the CER of recording or logging CER-data, i.e., data consisting of the token and process data is omitted.

3. As previously described, the SER records in the XSLM log the token passed, the LDI derived for the current license session, and other data as appropriate.

4. The Correlator retrieves and processes the SER-data that has been gathered to extract the tokens and the corresponding LDIs. The tokens are decompressed or decoded to obtain the process-id, thereby providing the correlation between the process and the licensing session corresponding to the LDI.

In yet another embodiment (D) the present invention functions as follows:

As described earlier, e.g., embodiment (A), XSLM agents are further augmented by one or more client exit-routines, which, if supplied, receive control during processing of one or more types of XSLM function-calls issued by the client. Optionally, when invoked, the CER is provided with the parametric input information originally supplied to the function-call by the software product and the return-code or completion-code. For example, if a CER exit receives control during the processing of a Get-License function call, the completion-code indicates, among other things, whether the requested license was granted.

When the client makes one of the specified XSLM function calls, the corresponding CER routine is invoked and then proceeds to gather and record process-related information including one or more of the following:
 process-id or job-id
 job-step-id
 "accounting" data pertaining to the job and as appropriate for the particular licensing function call
 LOS-id or corresponding identifier
 the identity or name of the module issuing the function-call
 date and time
 etc.

Additionally, the CER optionally gathers some or all of the parametric input data supplied to the function call (which serves to identify the software product requesting the license, the vendor, and the particulars of the type of license-usage being requested); and, the return-code or completion code of the function call.

The CER records all of this process-related information in the CLL.

Subsequently, the Correlator retrieves and processes the CER-data that has been gathered in the CLL. Each data record that has been written to the CLL contains all relevant process and licensing related information, inherently correlating process-id with applicable licensing data, ready for direct use.

In yet another alternative embodiment (E), XSLM agents are augmented by one or more client exit-routines, which, if supplied, receive control during processing of XSLM Get-License function-calls issued by the client. When the client makes a Get-License function call, the CER is invoked and then proceeds to gather and record process-related information that identifies the job, job-step, or process that made the call.

Optionally, as described in embodiment (A), the CER creates a token within the set of tokens generated by the CER on the current LOS. This token is then passed, along with other parameters and data connected with the Get-License function, to the XSLM server where it is further used in the processing of the request. Upon return, the CER records the process-related information in the XSLM log using the Log-Data function where it can later be retrieved and processed by the Reporter.

In another embodiment (F), the present invention, employing a CER, captures both process information and sufficient information about the various XSLM function calls that are issued in the client in conjunction with ongoing sessions, and records them in the CLL in order to later match this sequence with corresponding information independently recorded by the XSLM in its own log.

For example, from each Get-License that's issued, the information might consist of the associated process information, product-id, the date and time of the function invocation, and the LOS-id, all of which are recorded in the CLL. Correspondingly, the XSLM makes its own entry of licensing specific information in its own log.

At a later time, the Correlator is used to match the process specific information in the CLL to licensing sessions in the XSLM log.

Note that a given product might be licensed frequently, and repeatedly, by a number of different processes, resulting in numerous dialogs being recorded on the XSLM log. Even if a timestamp is included as part of the data on the XSLM log (and it may not be), the time will be the time the Get-License was processed in the XSLM server, which may only approximately match the time of the Get-License within the client. Therefore, even for Get-License activity in both the client and the server for the same product, the time-stamp may not provide a clear-cut means for the Correlator to match a particular Get-License instance (and its associated process-related data) that was recorded in the client with the corresponding data written from the server.

Instead, the Correlator matches the data from the two sources by finding nearly identical sequences of activity. For example, the CLL-data might show that Get-License function-calls were issued in the client for the following products, in the following order:
 M-B-G-T-R-R-S-A-Z-P-W-B-G-I-T-R-R-O- . . .

and in the server in the following order:
 H-U-P-T-R-R-M-B-G-E-V-Y-E-M-B-M-B-G-T-R-R-S-A-Z-P-W-B-G-I-T-R-R-O-R-T-G-M . . .

Various well-known methods of correlation may be used, including: shear brute-force pattern matching, sequence alignment matching, ternary search trees, applying Genome matching principles, etc. However, the procedure will benefit if it first eliminates from the server list any product entry that is not in the client list since the server is managing licensing for multiple LOSs. This is first performed on the basis of the LOS-id and, possibly using another such parameter specific to that LOS. For the previous example, the server data entries for E, H, P, U, V, and Y do not appear in the client list, hence they are deleted from the server list:
 T-R-R-M-B-G-M-B-M-B-G-T-R-R-S-A-Z-W-B-G-I-T-R-R-O-R-T-G-M . . .

The next step is to locate the sequence containing most, if not all, of the same elements in the CLL:
 -M-B-G-M-B-M-B-G-T-R-R-S-A-Z-W-B-G-I-T-R-R-O . . .

In this example, there are duplicate entries that must be resolved. The matching method may apply other identifying factors to further resolve the list. For example, an arbitrarily high degree of confidence may be obtained based on how many elements must match before a sequence-match is assumed. If time-stamps are also available in the data, they may be used to roughly zero-in on the section of the data at which the match testing should begin and to resolve apparent duplicates.

Once a sequence from the client has been matched with a sequence from the server, the corresponding process data is correlated with the session data, as required.

NOTE: The XLSM specification provides for timestamps from the server and agent for each event to be included within the log records. The agent timestamp is provided by the agent as part of the "hidden" request data that always is passed between agent and server. Thus, the invention includes matching similar to the above using the actual timestamps. However, it may be decided in a particular implementation that the client timestamps are optional. Therefore one cannot always rely on its presence.

In yet another embodiment (G), the user-id is used to correlate license dialogs with job processing information.

When a software product is executed by another process, it initiates a licensing session with the server by requesting a license (Get-License). In addition to the identity of the software product, one of the items of parametric information supplied to the Get-License function call is the identity of the user executing the process (or, for non-online, batch, processes, the user-id on whose behalf the process is being executed).

In many cases, a single user-id may be associated with more than one concurrent session. Typically, this occurs if a user is engaged in multiple concurrent online sessions, or if multiple batch jobs or processes associated with the user happen to execute concurrently. The latter circumstance is particularly likely in the OS/390 mainframe environment, where it is common for hundreds of jobs to be executing at any given time. However, there are many occasions when a single user might be engaged in only a single licensing session at a given time. For example, this might be the case on certain computer systems, such as those systems that only execute a single process at a time. Or it might be the case even on multi-processing systems that certain users are never responsible for more than one concurrent licensing session (though other users on that system might be responsible for more than one).

In such situations, the Correlator uses the user-ids to correlate processes with licensing dialogs as follows:
1. Determine the set (one or more) of known LOSs and user-ids to consider. This may be user-specified, a pre-determined set, or simply all found.
2. Determine the source of process related data to consider. This may consist of the SMF log and, if applicable, other logs containing similar information.
3. From the timestamp contained in the XSLM dialog data, select those dialogs that
   a) begin and end within the duration of a particular process, as determined from the timestamp information contained in the process-related data,
   b) pertain to the same user-id, and
   c) for which no other process exists for the same user-id that is in whole or in part concurrent with the aforesaid process.
4. For each matching record found, process the information as follows: Print report, write to a log file, pass to another process, etc.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A job accounting and chargeback system for software products, the system comprising:
   a software license manager comprising a software product use monitoring subsystem that handles requests for and grants rights to use licensed software products, the use of which requires payment of specified license fees to one or more software product licensors, said software license manager further operable to develop software product use information;
   a job accounting and chargeback (JACS) subsystem that develops chargeback data that is applicable to charged entities that are separate of and unrelated to the software product licensors and to the specified license fees, and said job accounting and chargeback system allocates the specified license fees in accordance with predefined criteria based on the charged entities utilization of software or computer facilities;
   a job accounting and software use intercoupling facility that intercouples the software product use information provided by the software license manager with the chargeback data in a manner that provides software-product chargeback information; and
   a process-data collector that develops process-related data and the job accounting and chargeback subsystem deriving identities of the charged entities from the process-related data.

2. The system of claim 1, in which the software-product chargeback information comprises cost information for the use of the software products and the manager is a license manager.

3. The system of claim 1, in which the software-product chargeback information is referenced to software product vendors.

4. The system of claim 1, in which the process-related data comprises process detail records.

5. The system of claim 4, in which the process detail records comprise links to event log records.

6. The system of claim 1, in which the software-product chargeback information comprises process-product-link records and each such record comprises at least two fields.

7. The system of claim 6, in which the at least two fields include a key field pointing to a process detail record and product key field.

8. The system of claim 7, in which the product key field comprises a vendor id or a product id.

9. The system of claim 7, further comprising a third field, which is a link to a particular licensing session.

10. The system of claim 1, further including a plurality of software clients operable with corresponding client exit routines, components of the job accounting and chargeback subsystem being present in the client exit routines.

11. The system of claim 1, in which the process-related data comprises system management facility (SMF) records.

12. The system of claim 1, including a process-to-product link table.

13. The system of claim 1, including a process-to-product vendor link table.

14. The system of claim 1, in which the intercoupling facility correlates the software-product chargeback information to specific product licensing sessions.

15. The system of claim 1, including a facility that develops the software-product chargeback information over selected time periods.

16. The system of claim 1, including a facility that compares chargeback data against budgeted charges relative to specific software products.

17. The system of claim 1, including a reporter that generates viewable reports, displaying selected portions of the software-product chargeback information.

18. The system of claim 17, the reporter including a data sorter.

19. The system of claim 1, including a facility that allocates to specific products a total cost, which cost is used by the job accounting and chargeback subsystem to develop the chargeback data.

20. The system of claim 1, including a facility that measures a parameter indicative of the extent of use of different ones of the software products and the parameter being selected from the parameter group consisting of: CPU time; elapsed time; number of queries to a database; number of records retrieved; and use peripherals related to the use of software products.

21. The system of claim 1, in which the software products act in the system as software clients and the manager is a license manager that acts in the system as a server and including a plurality of license manager agents that execute client exit routines in response to being presented with license requests from the software clients, and further including a JACS client exit routine that interacts with the client exit routine of the license manager agents, in a manner such that the JACS client exit routine obtains the process-related data which is then returned to the client exit routine.

* * * * *